United States Patent [19]

Sweany et al.

[11] E Re. 30,620

[45] Reissued May 19, 1981

[54] HIGH OUTPUT SMOKE AND HEAT DETECTOR ALARM SYSTEM UTILIZING A PIEZOELECTRIC TRANSDUCER AND A VOLTAGE DOUBLING MEANS

[75] Inventors: Louis P. Sweany, Carmel; Michael T. Burk, Indianapolis, both of Ind.

[73] Assignee: P. R. Mallory & Co. Inc., Indianapolis, Ind.

[21] Appl. No.: 921,483

[22] Filed: Jul. 3, 1978

Related U.S. Patent Documents

Reissue of:

[64] Patent No.: 4,096,473
Issued: Jun. 20, 1978
Appl. No.: 749,024
Filed: Dec. 9, 1976

[51] Int. Cl.[3] ..... G08B 17/10

[52] U.S. Cl. ..... 340/629; 250/381; 340/636

[58] Field of Search ..... 340/628, 629, 636; 250/381, 382, 384, 385, 389; 307/290

[56] References Cited

U.S. PATENT DOCUMENTS

| | | | |
|---|---|---|---|
| 3,774,186 | 11/1973 | Enemark | 340/630 |
| 3,805,259 | 4/1974 | Inoue | 340/629 |
| 3,811,123 | 5/1974 | Hamm et al. | 340/636 |
| 3,812,362 | 5/1974 | Larsen et al. | 340/629 X |
| 3,821,734 | 6/1974 | Meier et al. | 340/629 X |
| 3,895,367 | 7/1975 | Visser | 340/634 |
| 3,909,813 | 9/1975 | Scheidweiler et al. | 340/629 |
| 3,934,145 | 1/1976 | Dobrzanski et al. | 250/381 |

FOREIGN PATENT DOCUMENTS

| | | | |
|---|---|---|---|
| 902272 | 6/1972 | Canada | 340/629 |
| 948332 | 5/1974 | Canada | 340/629 |
| 2327497 | 12/1974 | Fed. Rep. of Germany | 340/511 |

OTHER PUBLICATIONS

"FET Increases Schmitt Trigger Input Impedance" by L. R. Lott, Electronics, Jul. 26, 1965, p. 65.

*Primary Examiner*—John W. Caldwell, Sr.
*Assistant Examiner*—Daniel Myer
*Attorney, Agent, or Firm*—Robert F. Meyer; David W. Gomes

[57] ABSTRACT

A high output smoke and heat detector alarm system comprises a high output audible alarm means which includes a piezoelectric transducer and a voltage doubling means in combination with an improved smoke and heat detector which includes a low voltage power supply source, an ambient temperature detecting means, at least one ionization sensing chamber, a voltage amplitude comparing means, and a low voltage sensing means.

14 Claims, 2 Drawing Figures

HIGH OUTPUT SMOKE AND HEAT DETECTOR ALARM SYSTEM UTILIZING A PIEZOELECTRIC TRANSDUCER AND A VOLTAGE DOUBLING MEANS

Matter enclosed in heavy brackets [ ] appears in the original patent but forms no part of this reissue specification; matter printed in italics indicates the additions made by reissue.

BACKGROUND OF THE INVENTION

Generally speaking, the present invention relates to smoke and heat detectors and more specifically to smoke and heat detector systems which produce an audible alarm utilizing a piezoelectric transducer. In the present invention a high output audible alarm means which includes a piezoelectric transducer and a voltage doubling means in combination with a smoke and heat detector which includes a low voltage power supply source, an ionization sensing chamber, and an ambient temperature detecting means; a logic driving means; and an acoustics enhancement means produce a high output smoke and heat detector alarm system.

Smoke and heat detectors which utilize ionization sensing chambers and an ambient temperature detecting means typically have two or more electronic circuits which are responsive to only one of the sensing or detecting devices. Such design techniques in previous smoke and heat detectors have resulted in discrete circuit elements which serve no more than one function. Accordingly, previous smoke and heat detectors which utilize such design techniques involve inefficient utilization of materials and power and therefore typically the cost of such detectors reflect this inefficiency.

Smoke and heat detector alarm systems have previously not utilized piezoelectric transducers because of the necessity to use a high voltage power supply source in order to produce an audible alarm signal of sufficient decibels to be useful as a warning system and, more recently, to meet government requirements for decibel levels of the audible output of smoke and heat detector alarm systems. Accordingly, where it has previously been desirable to utilize low voltage power supply sources in smoke and heat detector alarm systems an electromechanical horn or similar devices which are capable of producing a high decibel audible alarm using a low voltage supply source have been utilized. However, the use of devices such as electromechanical horns which are physically large, results in an audible alarm means which is segregated from the smoke and heat detector circuitry. The total smoke and heat detector alarm system therefore comprises the interconnection of descrete elements which results in the inefficient use of both power and material. Smoke and heat detector alarm systems utilizing electromechanical horns and similar devices along with associated circuitry to drive such devices also require large stand-by currents and large operating currents. The demand for large currents from low voltage power supply sources makes it necessary to use specially designed power supply sources which may not be readily available to the consumer.

Accordingly, it is a feature of the present invention to provide a totally integrated smoke and heat detector. Another feature of the present invention is to provide a highly efficient and low cost smoke and heat detector which includes a low voltage power supply source, an ionization sensing chamber, an ambient temperature detecting means, a voltage amplitude comparing means, and a low voltage sensing means. Another feature of the present invention is to provide a high output smoke and heat detector alarm which is a totally integrated system. Another feature of the present invention is to provide a smoke and heat detector alarm system utilizing a piezoelectric transducer and a voltage doubling means which produce a high output audible alarm. Another feature of the present invention is to provide a high output smoke and heat detector alarm system utilizing a piezoelectric transducer and a voltage doubling means which is responsive to a low voltage supply source of the type readily available to the average consumer. Another feature of the present invention is to provide a high output smoke and heat detector alarm system which includes integrated logic circuitry. Yet another feature of the present invention is to provide a totally integrated high output smoke and heat detector alarm system comprising a highly efficient smoke and heat detector which includes a low voltage power supply source, at least one ionization sensing chamber, and an ambient temperature detecting means; a logic driving means; a high output audible alarm means which includes a piezoelectric transducer and a voltage doubling means; and an acoustics enhancement means.

These and other features of the invention will become more apparent from the following description taken in conjunction with the accompanying drawings which follow:

DESCRIPTION OF THE PREFERRED EMBODIMENT

Figure 1:
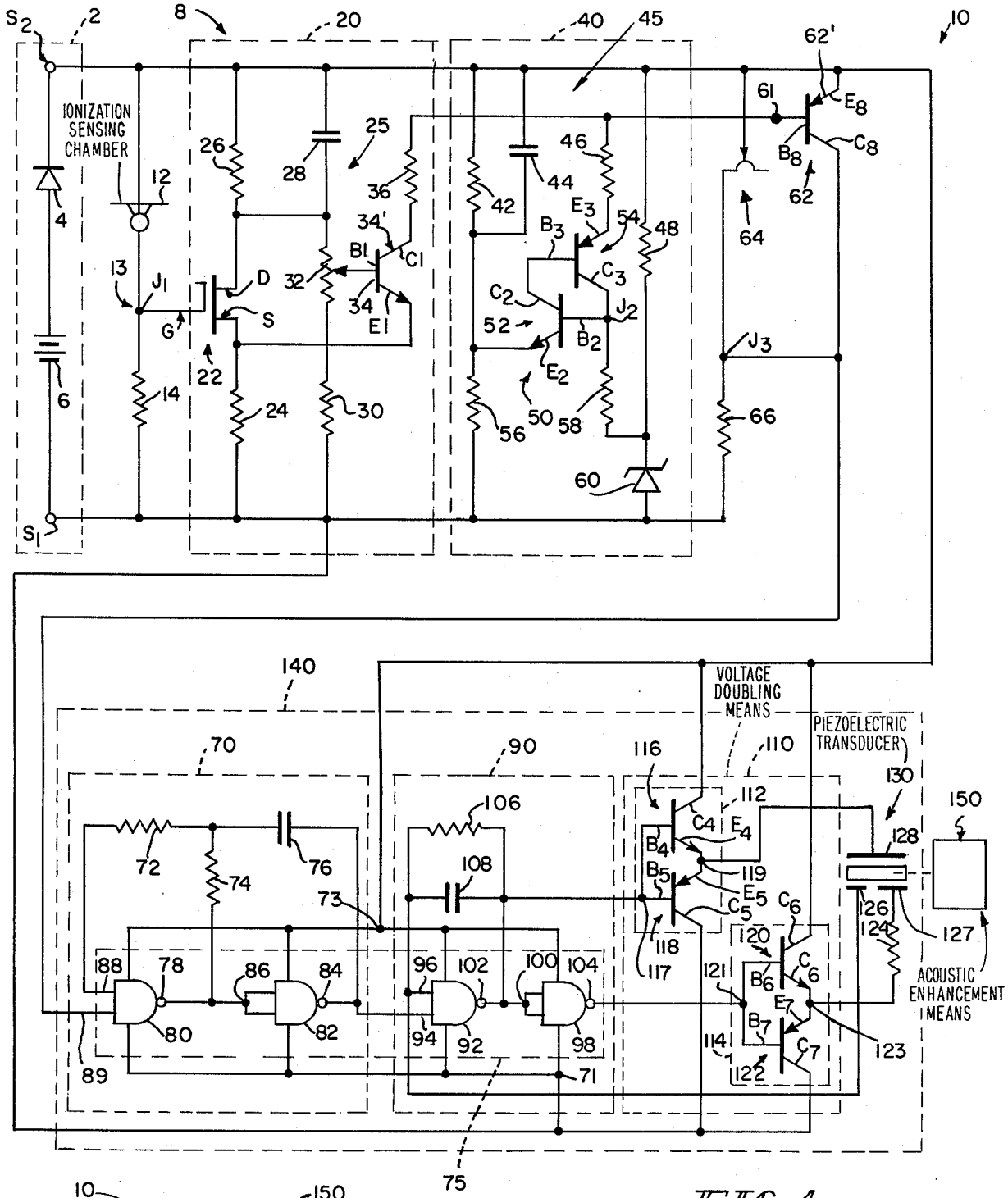
FIG. 1 is a wiring diagram of a high output smoke and heat detector alarm system utilizing a piezoelectric transducer and a voltage doubling means.

Referring to FIG. 1, a high output smoke and heat detector alarm system 10 comprises a smoke and heat detector 8, a high output audible alarm means 140, logic driving means 62, and an acoustics enhancement means 150.

Smoke and heat detector 8 includes a low voltage power supply source 2, a conventional ionization sensing chamber 12 for detecting smoke, an ambient temperature detecting means 64, a voltage amplitude comparing means 20, and a low voltage sensing means 40.

Power supply source 2 includes a negative side S1, a positive side S2, and a low voltage DC power supply 6 connected in series with a diode 4. Ionization sensing chamber 12 is electrically coupled to power supply source 2 and in series to a resistor 14 so as to comprise a voltage divider 13. Ambient temperature detecting means 64, which may be a conventional mechanical thermostat, is electrically coupled to power supply source 2 in parallel with ionization sensing chamber 12 and logic driving means 62. A first side of ambient temperature detecting means 64 is connected to side S2 of power supply source 2 and a second side to a first side of resistor 66 at junction J3. A second side of resistor 66 is connected to side S1 of power supply source 2. Junction J3 comprises an output of smoke and heat detector 8 and is electrically coupled to high output audible alarm means 140.

Voltage amplitude comparing means 20 is responsive to ionization sensing chamber 12 and comprises a schmitt trigger 25. Schmitt trigger 25 includes a field effect transistor (FET) 22 and a bipolar device 34 which in the preferred embodiment is shown as an NPN transistor 34'. Gate G of FET 22 is electrically coupled to ionization sensing chamber 12 at junction J1, its source S is electrically coupled to side S1 of power supply source 2 through a resistor 24 and to emitter E1 of bipolar device 34, and its drain D is electrically coupled to side S2 of power supply source 2 through the parallel combination of a resistor 26 and a capacitor 28 and to base B1 of bipolar device 34 through variable resistor 32. Variable resistor 32 controls the amount of voltage required at junction J1 to turn-on schmitt trigger 25. Base B1 of bipolar device 34 is also electrically coupled to side S1 of power supply source 2 through a resistor 30. Collector C1 of bipolar device 34 is electrically coupled to an output 61 of the smoke and heat detector 8 through a resistor 36.

Low voltage sensing means 40 comprises a relaxation oscillator 45. Relaxation oscillator 45 includes a programmable unijunction transistor (PUT) or an equivalent 50. For purposes of cost reduction a programmable unijunction transistor has been syntheized in the present embodiment by electrically coupling an NPN transistor 52 and a PNP transistor 54; however, it is noted that a standard PUT may be used and it is not intended that this invention be limited to the use of a synthesized PUT. Collector C2 of transistor 52 is connected to base B3 of transistor 54 and collector C3 of transistor 54 is connected to base B2 of transistor 52 at junction J2. Emitter E2 of transistor 52 is connected to a first side of a resistor 56 and a first side of the parallel combination of a resistor 42 and a capacitor 44, and emitter E3 of transistor 54 is connected to an output 61 of smoke and heat detector 8 through a resistor 46. A second side of resistor 56 is connected to side S1 of power supply source 2 and a second side of the parallel combination of resistor 42 and capacitor 44 is connected to side S2 of power supply source 2. Junction J2 comprises the gate of synthesized PUT 50 and is connected to a first side of a resistor 58. A second side of resistor 58 is connected to a first side of resistor 48 and the anode of reversed biased zener diode 60. A second side of resistor 48 is connected to side S2 of power supply source 2. The cathode of reversed biased zener diode 60 is connected to side S1 of power supply source 2. Resistors 48 and 58 and reversed biased zener diode 60 control the programmable turn-on voltage of synthesized PUT 50.

Logic driving means 62 comprises a PNP transistor 62' having its base B8 connected to an output 61 of smoke and heat detector 8, its emitter E8 connected to side S2 of power supply source 2, and its collector C8 electrically coupled to high output audible alarm means 140 and side S1 of power supply source 2 through a resistor 66.

High output audible alarm means 140 includes a pulsator means 70, an oscillator means 90, a voltage doubling means 110, and a piezoelectric transducer 130.

Pulsator means 70 for producing pulsations and reducing power consumption in smoke and heat detector alarm system 10 includes two two-input NAND gates 80 and 82 of a Quad-two-input NAND gate integrated circuit 75. An input 89 of NAND gate 80 is connected to collector C8 of logic driving means 62 and to an output J3 of smoke and heat detector 8. An input 88 of NAND gate 80 is connected to a first side of a resistor 72. A common input 86 of NAND gate 82 is connected to a first side of a resistor 74 and an output 78 of NAND gate 80. An output 84 of NAND gate 82 is electrically coupled to oscillator means 90 and connected to a first side of a capacitor 76. A second side of resistor 72 is connected to a second side of resistor 74 and a second side of capacitor 76.

Oscillator means 90 includes two two-input NAND gates 92 and 98 of a Quad two-input NAND gate integrated circuit 75. An input 94 of NAND gate 92 is connected to an output 84 of NAND gate 82 of pulsator means 70. An input 96 of NAND gate 92 is connected to a first side of the parallel combination of a resistor 106 and a capacitor 108 and to an electrode 126 of piezoelectric transducer 130. An output 102 of NAND gate 92 is connected to a second side of the parallel combination of resistor 106 and capacitor 108, to a common input 100 of NAND gate 98, and electrically coupled to voltage doubling means 110. An output 104 of NAND gate 98 is also electrically coupled to voltage doubling means 110.

A positive voltage terminal 73 of integrated circuit 75 is connected to side S2 of power supply source 2 and a negative voltage terminal 71 of integrated circuit 75 is connected to side S1 of power supply source 2.

Voltage doubling means 110 for providing a drive voltage to piezoelectric transducer 130 which is substantially double the voltage of power supply source 2 includes two bipolar buffer amplifiers 112 and 114. Bipolar buffer amplifier 112 includes an NPN transistor 116 and a PNP transistor 118. Base B4 of transistor 116 and base B5 of transistor 118 are electrically coupled to form a common base connection 117. Common base connection 117 of bipolar buffer amplifier 112 is connected to an output 102 of NAND gate 92 of oscillator means 90. Emitter E4 of transistor 116 and emitter E5 of transistor 118 are electrically coupled to form a common emitter connection 119. Common emitter connection 119 of bipolar buffer amplifier 112 is connected to electrode 128 of piezoelectric transducer 130. Collector C4 of transistor 116 is connected to side S2 of power supply source 2 and collector C5 of transistor 118 is connected to side S1 of power supply source 2. Bipolar buffer amplifier 114 includes an NPN transistor 120 and a PNP transistor 122. Base B6 of transistor 120 and base 87 of transistor 122 are electrically coupled to form a common base connection 121. Common base connection 121 of bipolar buffer amplifier 114 is connected to an output 104 of NAND gate 98 of oscillator means 90. Emitter E6 of transistor 120 and emitter E7 of transistor 122 are electrically coupled to form a common emitter connection 123. Common emitter connection 123 of bipolar amplifier 114 is connected to electrode 127 of piezoelectric transducer 130 through a resistor 124.

Piezoelectric transducer 130 operates at substantially resonant frequency and is therefore a piezo resonant transducer. Piezoelectric transducer 130 includes three electrodes 126, 127, and 128 wherein electrode 126 provides a coupling for a feedback loop which is connected to an input 96 of NAND gate 92 of oscillator means 90.

In operation, power supply source 2 provides a low input voltage to a high output smoke and heat detector alarm system 10. Such voltage must be sufficient to drive pulsator means 70 and oscillator means 90 of high output audible alarm means 140. Diode 4 serves as a blocking diode.

The detection of smoke in the environment surrounding smoke and heat detector alarm system 10 is accomplished by ionization sensing chamber 12. Under normal standby conditions in which there is little or no smoke in the surrounding environment being detected by the sensing chamber 12, the effective impedance of sensing chamber 12 and resistor 14 is approximately the same and therefore about half of the voltage of power supply source 2 appears at junction J1. FET 22 is connected to bipolar device 34 as a schmitt trigger 25 which continuously compares the amplitudes of the voltage at junction J1 and the voltage of power supply source 2. Variable resistor 32 controls the magnitude of the voltage necessary at junction J1 to cause schmitt trigger 25 to conduct. Variable resistor 32 is typically set such that the voltage required at junction J1 approximately equals the voltage of power supply source 2. When smoke enters sensing chamber 12 its impedance increases thereby resulting in an increase in voltage at junction J1. As long as the voltage J1 remains below the voltage set by variable resistor 32, schmitt trigger 25 will remain non-conductive. However, when the voltage at J1 reaches the trip voltage set by variable resistor 32, schmitt trigger 25 will conduct and a voltage will appear at an output 61 of smoke and heat detector 8 which approximates the voltage of supply source 2. Capacitor 28 is included in voltage amplitude comparing means 20 as an assurance against influence from undesirable frequencies in the surrounding environment.

Low voltage sensing means 40 is electrically coupled to sides S2 and S1 of power supply source 2. In response to low voltage conditions of power supply source 2 indicating its life termination, low voltage sensing means 40 conducts for approximately 5 seconds at 10–15 second intervals providing a signal at output 61 of smoke and heat detector 8. Low voltage sensing means 40 comprises a relaxation oscillator 45 which in its conductive state serves as a pulse generator as described above. Relaxation oscillator 45 includes a programmable unijunction transistor (PUT) 50 synthesized by electrically coupling an NPN and PNP transistor, 52 and 54 respectively. Synthesized PUT 50 is programmed to turn-on and thereby cause relaxation oscillator 45 to pulsate by reversed biased zener diode 60 and resistors 48 and 58. While power supply source 2 maintains a voltage sufficient to drive high output audible alarm means 140, zener diode 60 operates in its breakdown region; however, where a large decrease in the voltage of power supply source 2 occurs, zener diode 60 will no longer operate in its breakdown region and synthesized PUT 50 will turn-on thereby supplying a pulsating signal to output 61 of smoke and heat detector 8.

Since it is desirable to drive high output audible alarm means 140 at either positive or negative potential, output 61 of smoke and heat detector 8 which comprises a mixture of positive and negative signals from voltage amplitude comparing means 20 and low voltage sensing means 40 is connected to a logic driving means 62 which comprises a PNP transistor 62'. Base B8 of transistor 62' is connected to the positive side S2 of power supply source 2. Collector C8 of transistor 62' which is electrically coupled to high output audible alarm means 140 swings from positive to negative potential in response to the signals appearing at output 61. Accordingly, logic driving means 62 effectively reduces the current drain of high output audible alarm means 140 in its standby condition and assists in allowing the total smoke and heat detector alarm system 10 to operate at extremely low current levels.

The detection of ambient temperature changes by smoke and heat detector 8 is accomplished by ambient temperature detecting means 64. Ambient temperature detecting means 64 typically is a mechanical thermostat but may comprise any device having the ability to produce an electric signal in response to a change in ambient temperature. In response to low or normal temperature conditions, ambient temperature detecting means 64 is nonconductive; however, as the ambient temperature rises and reaches a preselected temperature level, ambient temperature detecting means 64 conducts. When ambient temperature detecting means 64 is nonconductive its impedance is substantially infinite thereby resulting in no voltage at output J3 of smoke and heat detector 8. When temperature detecting means 64 conducts its impedance is reduced to substantially zero resulting in substantially all of the voltage of power supply source 2 appearing at output J3. Output J3 being electrically coupled to high output audible alarm means 140 a high output audible alarm is thereby produced.

Pulsator means 70 of high output audible alarm means 140 is connected to output J3 and through logic driving means 62 to output 61 of smoke and heat detector 8. In response to a signal of sufficient voltage to drive pulsator means 70 from smoke and heat detector 8, whether of positive or negative potential, NAND gates 80 and 82 respectively cooperate with resistor 74 and capacitor 76 to cause the voltage at output 84 to alternately rise and fall in essentially a square wave manner at a repetition rate controlled by the values of resistor 74 and capacitor 76. This pulsating signal is directly fed to oscillator means 90.

In oscillator means 90, NAND gates 92 and 98 produce oscillations which are capable of driving piezoelectric transducer 130 into vibration near its resonant frequency whereby an audible alarm is produced. Electrode 126 of transducer 130 provides a feedback voltage of a magnitude and phase to permit sustained oscillations in oscillator means 90 until such time as the drive voltage to audible alarm means 140 is removed or reduced. When the voltage of the pulsating signal supplied from output 84 of NAND gate 82 to the input 94 of NAND gate 92 is near the input voltage of power supply source 2 oscillations will occur in oscillator means 90. When the voltage of the pulsating signal from output 84 is near zero potential the oscillations cease. NAND gate 92 is linearized by resistor 106 and capacitor 108 provides an attenuation of spurious signals appearing at input 96 of NAND gate 92 which may be either external or within the feedback voltage coming from piezoelectric transducer 130.

Since the sound pressure level (decibels) emitted by transducer 130 operating at substantially resonant frequency is a direct function of the voltage applied across it, voltage doubling means 110 allows the voltage applied across transducer 130 to be substantially double the input voltage of power supply source 2 thereby substantially increasing the volume output of smoke and heat detector alarm system 10. Bipolar buffer amplifiers 112 and 114 are capable of supplying output pulse signals corresponding to either a positive or negative input signal. As buffers, amplifiers 112 and 114 isolate oscillator means 90 from effects of variations in the impedance of transducer 130 on the outputs 102 and 104 of NAND gates 92 and 98 respectively and in addition provide a low impedance drive source for transducer 130. Outputs 102 and 104 of NAND gates 92 and 98 respectively, provide simultaneous pulse signals of opposite polarities to bipolar buffer amplifiers 112 and 114 respectively. Pulse signals having negative polarities switch on NPN transistors 116 and 120 and pulse signals having positive polarities switch on PNP transistors 118 and 122. Accordingly, the output signals of bipolar buffer amplifiers 112 and 114 appearing at electrodes 128 and 127 respectively of transducer 130 are swinging from positive to negative potential. Because of the shunting capacitance properties of transducer 130, the instantaneous vector sum of the two voltages appearing at electrodes 128 and 127 is equal to substantially double the input voltage of power supply source 2. Accordingly, by utilizing voltage doubling means 110 the power applied to transducer 130 is substantially four times that of power supply source 2. Also, because of the inherent capacitance of transducer 130, resistor 124 is connected in series with transducer 130 to limit instantaneous current peaks which occur when the polarities of the potentials across transducer 130 are suddenly reversed.

Figure 2:
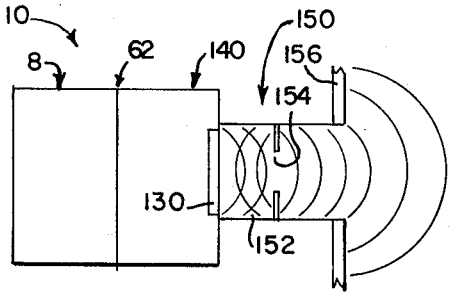
FIG. 2 is a sectional view of an acoustics enhancement means shown in combination with a representation of a piezoelectric transducer and the accompanying circuitry of a high output smoke and heat detector alarm system.

Referring now to FIG. 2 a high output smoke and heat detector alarm system 10 includes a smoke and heat detector 8, logic driver means 62, a high output audible alarm means 140 which includes a piezoelectric transducer 130 (all previously described and therefore shown as representations), and an acoustics enhancement means 150 which in the illustrated embodiment, comprises an aperture termination 154 in spaced relation to piezoelectric transducer 130, a resonant cavity 152 coupled to piezoelectric transducer 130, and a single wavelength baffle 156 acoustically coupled to piezoelectric transducer 130. For purposes of this disclosure the term aperture termination shall mean a load coupled to the audible output of piezoelectric transducer 130 comprising an opening through which sound waves can pass and the term resonant cavity shall mean a space totally or partially enclosed having a predetermined resonant frequency. Acoustics enhancement means 150 provides efficient acoustic coupling and improved fidelity of the audible output of high output audible alarm means 140 to the surrounding environment. In operation, the audible output of high output audible alarm means 140 is intensified by exciting resonant cavity 152 to its resonant frequency; acoustically matched to the air mass of the environment surrounding smoke and heat detector alarm system 10 by means of an aperture termination 154, and accurately reproduced for maximum penetration into the surrounding environment by a single wavelength baffle 156 thereby increasing the overall electroacoustical efficiency of the smoke and heat detector alarm system 10.

What is claimed is:

[1. In a smoke and heat detector comprising a low voltage power supply source, an ambient temperature detecting means electrically coupled to said power supply source, at least one ionization sensing chamber electrically coupled to said power supply source in parallel with said temperature detecting means, and a voltage amplitude comparing means electrically coupled to said ionization sensing chamber and said power supply source, the improvement wherein said voltage amplitude comparing means includes a field effect transistor and a bipolar transistor which in combination comprise a schmitt trigger.]

[2. The smoke and heat detector as recited in claim 1 wherein said field effect transistor has its gate electrically coupled to an output of said ionization sensing chamber, its source electrically coupled to one side of said power supply source through a parallel combination of a resistor and a capacitor, and its drain electrically coupled to another side of said power supply source through a resistor.]

[3. The smoke and heat detector as recited in claim 2 wherein said bipolar transistor is an NPN transistor having its emitter electrically coupled to said source of said field effect transistor, its base electrically coupled to said drain of said field effect transistor through a variable resistor, and its collector electrically coupled to an output of said smoke and heat detector through a resistor.]

[4. The smoke and heat detector as recited in claim 1 further comprising a low voltage sensing means electrically coupled to said power supply source.]

[5. The smoke and heat detector as recited in claim 4 wherein said low voltage sensing means includes a relaxation oscillator and a zener diode.]

[6. The smoke and heat detector as recited in claim 5 wherein said relaxation oscillation includes a programmable unijunction transistor.]

7. A high output smoke [and heat] detector alarm system comprising, in combination, a smoke [and heat] detector which includes a low voltage power supply source, [an ambient temperature detecting means,] and at least one ionization sensing chamber; and a high output audible alarm means responsive to said smoke [and heat] detector *and* which includes a piezoelectric transducer and a voltage [double] *doubling* means whereby a voltage is supplied to said piezoelectric transducer which is double said power supply source voltage.

8. The alarm system as recited in claim 7 wherein said smoke [and heat] detector further includes a voltage amplitude comparing means electrically coupled to said ionization sensing chamber and said power supply source and a low voltage sensing means electrically coupled to said power supply source.

9. The alarm system as recited in claim 8 wherein said low voltage sensing means includes a relaxation oscillator and a zener diode.

10. The alarm system as recited in claim 9 wherein said voltage amplitude comparing means is a schmitt trigger.

11. The alarm system as recited in claim 10 wherein said schmitt trigger includes a field effect transistor and a bipolar transistor.

12. The alarm system as recited in claim 7 wherein said high output audible alarm means further includes a pulsator means electrically coupled to an output of said smoke [and heat] detector and an oscillator means electrically coupled to said pulsator means.

13. The alarm system as recited in claim 12 wherein said pulsator means and said oscillator means comprise a Quad two-input NAND gate integrated circuit.

14. The alarm system as recited in claim 13 further comprising a logic driving means responsive to said smoke [and heat] detector for driving said Quad two-input NAND gate integrated circuit.

15. The alarm system as recited in claim 13 wherein said piezoelectric electric transducer includes three electrodes.

16. The alarm system as recited in claim 15 wherein said voltage doubling means includes at least two bipolar buffer amplifiers one of which is electrically coupled to a first output of said oscillator means and a first electrode of said piezoelectric transducer and another of which is electrically coupled to a second output of said oscillator means and a second electrode of said piezoelectric transducer.

17. The alarm system as recited in claim 7 further comprising an acoustics enhancement means acoustically coupled to said piezoelectric transducer.

18. The alarm system as recited in claim 17 wherein said acoustics enhancement means includes an aperture termination in spaced relation to said piezoelectric transducer.

19. The alarm system as recited in claim 18 wherein said acoustics enhancement means further includes a resonant cavity coupled to said piezoelectric transducer.

20. The alarm system as recited in claim 19 wherein said acoustics enhancement means further includes a single wavelength baffle acoustically coupled to said resonant cavity.

* * * * *